Sept. 17, 1940.    R. G. GUTRIE    2,214,925
ADSORPTION BODY AND METHOD OF MAKING THE SAME
Filed Aug. 26, 1937    3 Sheets-Sheet 1

Inventor
Robert G. Guthrie

Sept. 17, 1940. R. G. GUTRIE 2,214,925
ADSORPTION BODY AND METHOD OF MAKING THE SAME
Filed Aug. 26, 1937 3 Sheets-Sheet 2
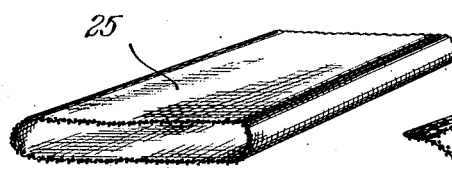
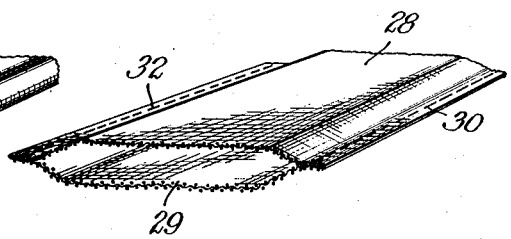
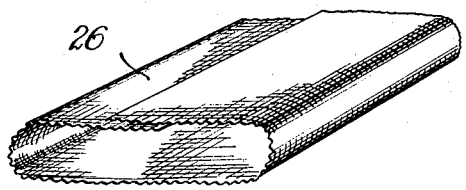
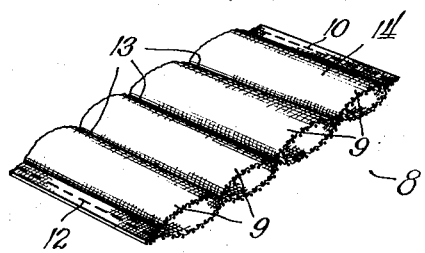
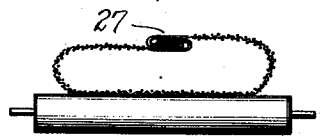
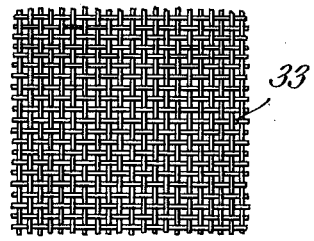
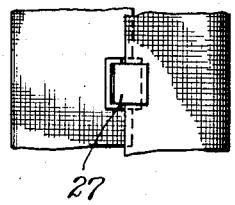
Inventor:
Robert G. Guthrie.

Sept. 17, 1940.   R. G. GUTRIE   2,214,925
ADSORPTION BODY AND METHOD OF MAKING THE SAME
Filed Aug. 26, 1937   3 Sheets-Sheet 3
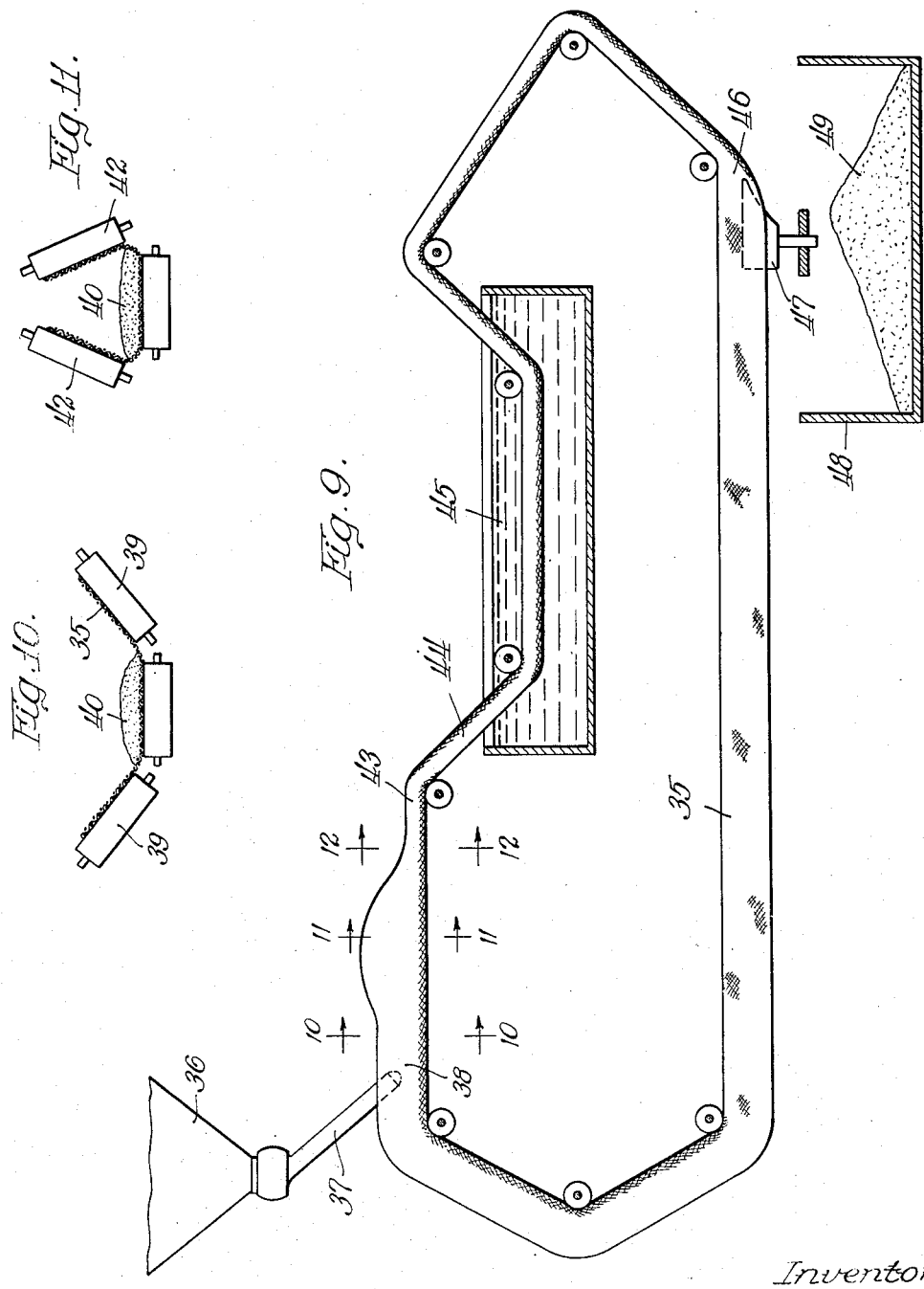
Inventor:
Robert G. Guthrie.

Patented Sept. 17, 1940

2,214,925

UNITED STATES PATENT OFFICE 2,214,925

ADSORPTIVE BODY AND METHOD OF MAKING THE SAME

Robert G. Guthrie, Chicago, Ill., assignor to Peoples Gas By-Products Corporation, Chicago, Ill., a corporation of Illinois Application August 26, 1937, Serial No. 161,001

17 Claims. (Cl. 252—2)

My invention relates to a method of forming an adsorptive body or pad. Such a pad or body may be employed for various purposes such, for example, as removing water vapor from air for drying or conditioning purposes, for extracting and recovering solvents and the like, for collecting constituents of a gaseous mixture, and other purposes.

The production of "Lamisilite," that is, a flaky, amorphous allotropic form of silicon dioxide having very high adsorptive properties, is known, see Patent No. 1,898,774, granted to myself and Oscar J. Wilbor.

This material is a loose, flaky mass of unusual properties, making it highly desirable for adsorptive purposes. The ore from which it may be made is known under several names, such as "vermiculite," "biotite," "jeffersite," and so forth. It is a mineral apparently waterlaid, consisting of layers of substantially pure silica in thin plate or flake form, with impurities covering the silica plates or flakes and interspersed between them in a compact mass.

By the process described in the aforesaid patent the ore or mineral is treated by crushing or grinding to a suitable size such, for example, as about 15 mesh, such impurities as can be removed are removed by various separating methods such as washing or gravitational separation, and the cleaned ore is then subjected to sulphuric acid to dissolve out the impurities and to leave the flake or plate-like particles of silica. Heat may be used to accelerate the action, or it may be used initially to exfoliate the ore so that the laminae are more or less separated and the acid may act more rapidly.

While such treatment of the ore to produce the silica flakes or plates is known, the handling of the material during and after its production presents a difficult problem because of the fragile nature of the plates or flakes. Also, after the material is prepared and requires to be put to use, the method of retaining the same in suitable manner and condition to permit proper access of the gaseous medium to the material presents a difficult problem in handling. Furthermore, after the material has been in use, cleaning and renovating is sometimes required and its handling during such cleaning, renovating and restoring to use, presents a difficult problem.

The present application is a continuation-in-part of my copending application, Serial No. 133,132, filed March 26, 1937.

The present invention is applicable not only to the production of "Lamisilite," or silicon dioxide flakes, but is applicable to the handling of many loose, fragile materials which are subject to injury to their physical, chemical, or other properties by handling according to known methods of handling loose materials. Since the material, in its preparation, must be treated with relatively strong sulphuric acid and since, during renovation, it may likewise be similarly subjected to treatment by this acid, strong alkalies or the like, the problem of production, utilizing and renovating has heretofore produced no simple procedure.

According to the present invention, I utilize a flexible fabric container for handling the material in each of the above stages or all of them.

According to the present invention I construct a container which is flexible and pliable and of bag-like characteristics. The container is preferably made of a coarse open mesh of flexible fibers or strands which are inert to the heat and to the reagents encountered in the production, use and renovation of the adsorbent material.

As a first example of a container of suitable character I construct the container of a cloth made of glass fiber threads, the glass fibers being of a very fine, silky character. The glass is preferably the flint type of glass and the fibers which are drawn or spun are of a diameter of the order of .001 inch or less. These fibers are long and silky and they may readily be spun into thread and woven or knitted into a fabric. The fibers are soft and flexible and feel very much like silk between the fingers, and they have a very considerable mechanical strength. The fibers are very flexible and withstand bending without breakage. The cloth or fabric which is formed of them is strong mechanically and is inert chemically to all ordinary reagents in the same manner that glass is, and this cloth will withstand temperatures comparable to the temperatures which the glass will withstand. This type of glass fiber or spun glass is now produced by the Corning Glass Works.

The type of fabric which I prefer to employ is of about the texture of the usual gunny sack, being a loosely woven, fairly strong fabric, freely permeable to fluids. The inert character of the container thus produced is highly desirable and it is not affected by temperatures as high as 200° or 300° F. or higher, which temperatures may be encountered in the production or use or renovation of the material.

As a second example of the type of fabric which I may employ I provide a woven or knitted fabric of organic fibers such as cotton, rayon, silk or the like, coating the fibers completely with "Thiokol,"

which is a synthetic rubber coating material. By thus coating the otherwise destructible organic fibers with the synthetic rubber coating material they are rendered resistant not only to the acids, alkalines and the like encountered in the production, utilization and renovation of the adsorbent material, but also maintained in a highly flexible, porous condition suitable for penetration by the fluids to be contacted with the adsorbent material. Also, they are resistant to the usual impurities in the gas and to oils, grease, gasoline and acids which may be encountered in the gaseous medium to be treated. Any solvent which would tend to attack the synthetic rubber coating material should obviously not be employed in connection with fabric coated with this material.

As a modification of the possibility of coating otherwise destructible fibers or strands with a coating material such as "Thiokol," various coating materials such as "Bakelite" solutions which are impervious to chemicals may be employed. Various gums or resins may be used.

As a third example of a suitable fabric for making the container, stainless steel strands of suitably fine dimensions may be employed. Other metallic fibers or strands inert to the reagents and temperatures encountered may similarly be employed in the construction of the flexible fabric container for producing, utilizing and renovating the adsorbent material.

While I prefer to introduce the ore into the container which is finally used in the treatment and/or renovation of the material, it is to be understood that the material may be transferred, within my invention, from a bag or container of open mesh type for treatment or production of the material and thereafter disposed in a container particularly adapted for contact with the gaseous medium to be treated, and again the loose material may be charged into a bag more suitable for renewal or renovation of the material.

The ore to be converted into "Lamisilite" may be charged into a container made of flexible fibers or strands inert to the reagents to be encountered and then leached with acid, washed and dried, with minimum injury to the resultant product. In either the same container or in a different container of the same general character, the "Lamisilite" or similarly produced material may then be employed in the adsorption of vapors or gases and, after a number of operations of adsorption and stripping of the vapors or gases therefrom, the container with the material therein may be subjected to a renovating operation with a suitable cleaning reagent and a subsequent drying operation. The drying may be done by swinging the pad containing the active material about a moving shaft or head in the nature of a centrifuge device, without the necessity of handling the material loose or in bulk.

While I refer particularly to the treatment of ores for the production of a product and the utilization of the same in such a container, I do not intend to limit the invention to the specific application herein stated, as it will be at once apparent to those skilled in the art that where it is desired to subject materials of similar character, or small objects in bulk, to such operations as leaching, washing, drying and the like, and particularly where fairly high temperatures are encountered, the container and method of my invention are peculiarly applicable.

While reference is made specifically to glass fibers, it is to be understood that other inorganic fibers such, for example, as asbestos fibers or other silicious fibers, whether artificially or naturally produced, may be employed in substantially the same relation as glass.

By my invention the handling of loose materials utilized in the performance of industrial processes is greatly enhanced. Injury to the material is prevented, and its renovation or renewal made possible within the container in which it is employed in the particular operation.

In brief, I produce a pad or mat of a loose material by confining the same in a suitable inert flexible fiber container, thereby giving the mass of material a definite mechanical form and a cohesion without impairing its useful properties and without limiting the temperature conditions or chemical reagents to which the material itself may need to be subjected to perform its desired function. The retention of the loose material in the bag-like container permits the material also to be disposed in advantageous thicknesses or dimensions and yet be capable of convenient handling.

While I mention the holding of the material loosely within the container it is to be understood that the container may be suitably stitched or provided with transverse walls so as to hold the material more definitely in position. Also it is to be understood that, in connection with the inert fiber fabrics of my invention, the active material may be caused to adhere to the supporting fibers or strands either on the inside of the bag or container or upon the outside surfaces of a sheet or panel of the same. Alternatively, the material may be caused to adhere completely or in part upon opposite sides of a sheet or panel and the opposite surfaces of the same covered loosely with further sheets or panels of the inert, loosely woven material. The same may be true of the inside of a bag-like container, with some of the material caused to adhere to the inner surfaces and some of the material loosely held between such adherent particles, or the two active bodies separated by an interposed sheet or panel.

Now in order to acquaint those skilled in the art with the manner of practicing my invention I shall describe, in connection with the accompanying drawings, a specific embodiment of the same, and its mode of use.

In the accompanying drawings:

Figure 5 is an isometric view of a tubular fabric container made of inert fiber threads or strands suitable for use in accordance with my invention;

Figure 6 is a similar view of a container made up by stitching together with suitable threads or strands of inert character two sheets of the inert fabric suitable for use according to my invention;

Figure 7 is a similar view of a tubular container constructed by overlapping the edges of a sheet of inert material;

Figure 8 shows a completed pad made up of a container of inert fibers or strands of my invention with compartments which are charged with suitable loose material and which may be subjected to the operations of leaching, washing, drying, and/or gas and vapor contact such as is contemplated within my invention;

Figure 9 is a diagram of a continuous leaching device employing a belt of the inert fabric of my invention;

Figure 10 is a cross-sectional view taken on the line 10—10 of Figure 9;

Figure 11 is a similar cross-sectional view taken on the line 11—11 of Figure 9;

Figure 12 is a cross-sectional view taken on the line 12—12 of Figure 9 showing a method of fastening together the edges of the belt or container;

Figure 13 is a plan view of Figure 12; and

Figure 14 is a front elevational view of a fabric made of inert flexible fibers or strands.

Figure 1:
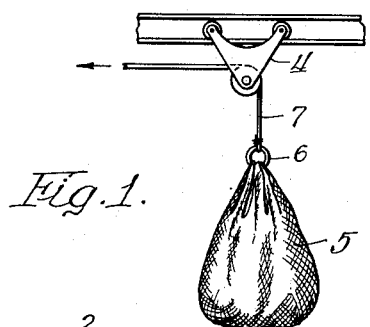
Figure 1 is a diagram of means for leaching ores according to my invention.

In Figure 1 I have indicated a suitable tank 1 in which sulphuric acid of a suitable strength is maintained with suitable agitation as by means of the pump 3. A conveyor 4 provides means for conveying to and from the tank 1 a suitable charge of the ore to be leached. The ore is contained in a bag container 5 which may be made in the shape of a net or sling, the edges of the same being held as by ring 6 suspended as by means of a suitable strand 7. The ore in this case is "vermiculite," which is of laminated structure containing layers of substantially pure silica with impurities which are removable by leaching with acid, as in the bath 2. The operation of dipping the bag or net 5 into the tank 2 and raising of the same may be repeated as often as desired, or the bag may be allowed to remain for the desired length of time in the bath which is circulated by the pump 3. The loose weave of the fabric of the bags is illustrated in Figure 14.

Obviously, a knitted fabric instead of a woven fabric may be employed if desired. The net or bag 5 with the charge of ore may be dipped in various strengths of acid, and may be washed and subjected to a drying operation thereafter.

The ore within the bag 5 is transformed into "Lamisilite," which, as above explained, is an allotropic amorphous form of silicon dioxide in the shape of thin laminae or flakes having a very high ratio of surface to volume and being highly porous. It has the property of adsorbing condensible vapors or absorbing liquid or vapor phase material. The finished product may remain in the container or bag 5 for use in adsorption or absorption work, such, for instance, as the recovery of solvents from the vapor phase, or the extraction of moisture from the air in air conditioning work and the like. The loose material, such as "Lamisilite," may be formed into a pad or definite body by the use of the container of inert fibers or strands such as silicious fiber fabric, containing the loose material. In other words, while the treatment of the ore to produce the finished product may be done more expeditiously in a container adapted for that purpose, I may nevertheless, due to the stable character of the container, charge the ore into a container the shape and character of which is peculiarly adapted to the service for which the finished product is more suited. Thus, for example, in Figure 8 I have shown a pad or mattresslike body 8 formed of an outer skin or container 14 consisting of glass fiber fabric or other inert fibers or strands containing pockets, such as 9, in which the "Lamisilite" or a similar loose material may be held within the loose texture of the bag or covering 14. The fabric is stitched together at the ends, as at 10 and 12, by glass fiber or other inert thread and similarly lines of stitching as at 13 may be employed to form the pockets 9. This pad or mattress 8 in the shape illustrated in Figure 8, or in any desired shape, may be initially charged with ore, and the ore may be leached in place in the pad or mattress, so that the finished product is formed inside of the inert fabric container, and then the pad or mattress 8, either in the particular shape shown or in any preferred shape, may be employed in the service to which the loose material, such as the "Lamisilite," is to be employed.

The inert bag or container may be made, as I have heretofore explained, of glass fiber fabric, of asbestos fiber fabric, of organic fibers coated with "Thiokol," "Bakelite" or the like, or of metallic fibers or strands inert to the reagents and temperatures involved. In like manner the various containers herein disclosed may be so constructed to produce an inert flexible fiber fabric suitable for the particular service encountered.

The inert fabric bag, such as 5, shown in Figure 1, may be employed for leaching or dipping loose material of any kind. Such a bag may be formed as a circular net as shown in Figure 1, or it may be made in tubular form, as shown at 15 in Figure 2, with the upper end closed off as at 16, and the lower end of the tubular bag closed off as at 17 for the more convenient reception and discharge of the material or article to be treated.

The bag or container of inert flexible fiber fabric may be supported on the trolley conveyor 18.

The bag or container made of inert flexible fiber fabric may be supported on a trolley conveyor 18 and passed through the bath of acid or the like, shown at 19 in the tank 20, and after traveling through said bath may be raised out of the bath and carried over into a second bath 22 in the adjacent tank 23, all by suitable arrangement of the conveyor mechanism. Thus leaching in different liquid, or in liquids such as acids of different strengths or washing after treatment in acid, may be carried out by passing successive containers 5 through the system.

Figure 3:
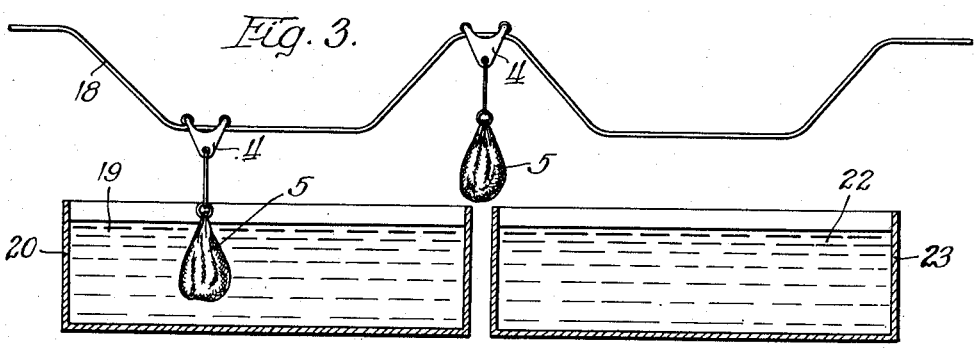
Figure 3 is a diagram illustrating the leaching of ores or the like in successive baths or tanks.
Figure 4:
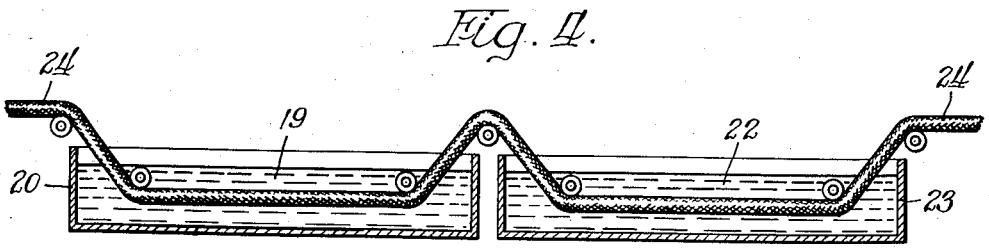
Figure 4 is a diagram illustrating the use of a continuous belt or tubular container for leaching ores or the like in successive stages.

If desired, a continuous belt arrangement for passing the ore or other material to be treated may be employed, as shown in Figure 4. This belt 24 may be a continuous tubular member of the type shown in Figures 5 to 8, 12 and 13. A seamless tubular belt 25 is illustrated in Figure 5, and this may be charged with the desired material for treatment and subsequent use, and made in any desired length. Instead of a continuous length, as indicated in Figure 4, obviously the material may be handled in successive lengths which are joined together and passed over suitable guide rollers, first through the bath 19 and then through the bath 22, in a manner similar to the successive treatment indicated and described in connection with Figure 3.

A suitable tubular container may be constructed either by knitting a seamless tube, such as 25 shown in Figure 5, or the tubular container may be made of a continuous strip with the edges overlapping as indicated at 26 in Figure 7. These edges may be held in register as by means of clasps 27 shown in Figures 12 and 13. The clasp is made in two parts, one on each edge hooked into each other to hold the edges together. The tubular container may also be made of a pair of strips, such as 28 and 29, attached together at the edges as at 30 and 32, or a single strip may be folded over with the edges at one side stitched together.

Instead of a continuous open tubular container, cells may be formed as indicated at 9 in Figure 8, these cells to be filled from one edge, which is thereafter closed as by stitching.

The character of the fabric is indicated in Figure 14, being either loosely woven or knitted to present free access of the acid or other treating liquid or fluid to the contents of the container. The fabric 33 shown in Figure 14 may be made of spun glass threads cross woven loosely as indicated. Obviously, other silicious fibers may be employed for making up the thread, or a part of them, or the material may be made up of fibers of different origin, such as glass and asbestos, if desired. Similarly, coated destructible fibers as above described, or fibers or strands of suitable metal may be utilized.

For a continuous treatment of a loose material, the system shown in Figures 9, 10 and 11 may be employed. A continuous web 35 supported on suitable rollers, which may be of rubber, "Thiokol," "Duprene," or other suitable material which is not subject to attack by the reagents employed in the process, is driven thereby and held at various points in suitable position to perform the desired operations of, first, receiving the loose material into the belt, closing the belt, passing the same through the treating fluid, then opening the belt to discharge the treated material, and thereafter again to receive a fresh charge of the raw material.

The raw material, such as ore, is contained in the hopper 36, and is discharged through a spout 37 onto the belt at 38, the belt being held in open troughlike form by suitable side rollers, such as 39, 39 to receive the raw material 40. Thereafter the belt is folded over by suitable guiding rollers 42, 42 or other guiding means, to cover the top of the material 40 and to close the belt into tubular form, as indicated at 43 in Figure 9. The belt 35 containing the material is then passed at 44 into the bath of treating liquid 45. Where the material is "vermiculite" ore or the like, the bath 45 may be sulphuric acid, and instead of a single tank, a plurality of tanks may be arranged as in Figure 4, for treatment and washing. The belt may be passed under running water for final washing if desired, and it may be passed through a drier for removing the excess moisture, and it is then conveyed to the point 46 where the belt is opened as by a spreader 47 to discharge the contents of the belt into the box or bin 48 which holds the finished material 49. The return run of the belt, guided by suitable rollers, 39, 39 (omitted for sake of clearness) is then brought back to the horizontal run where it receives the raw material at 38.

The concept of the continuous treatment through the use of a web or belt of inert flexible fabric such as glass fiber fabric or equivalent silicious fiber fabric is capable of wide application where reagents or temperatures injurious to ordinary flexible fabrics are or may be encountered.

Figure 2:
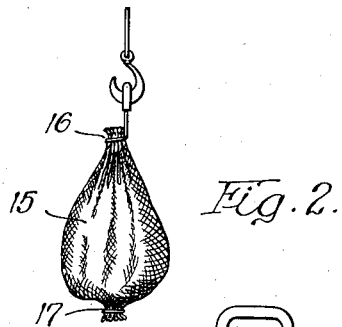
Figure 2 is a similar diagram of a modified form of container for the same.

A continuous belt of the type illustrated in Figure 4 may be formed by leaching with the ore contained therein, and then removed to the place of use, where it is brought into contact with gas containing a constituent to be absorbed or adsorbed, and then subjected to a stripping operation for the removal of the absorbed or adsorbed constituent. A belt thus constructed may be utilized for the recovery of volatile solvents or the like, or for removing undesirable constituents from gases, such, for example, as moisture from the atmosphere, for air conditioning purposes. In my companion application, Serial No. 134,072, filed March 31, 1937, instead of using a continuous belt for such adsorption or absorption work, pads or elements such as illustrated in Figures 1, 2 and 8 may be employed by subjecting the pads or elements successively to contact with the gaseous medium carrying the constituent to be removed, and then subjecting the pads or elements to a stripping operation as by heat and gas flow at pressures above or below atmospheric pressure. Reference is here made to said copending application for a full explanation of the method of use in gaseous fluid adsorption or contact process to which the pad or body of active material produced according to the present invention may be applied.

The container of my invention may be employed in forming solutions, for example, where a definite charge of material is to be dissolved in a definite volume of liquid or solvent, the solute may be charged into the flexible loose mesh container and then subjected to the action of the solvent until the solute is in solution. Similarly, by continuous process of contacting solute and solvent as by the system of Figure 9 by constantly adding solvent and abstracting the corresponding part of the solution, a continuous solution may be formed under conditions of temperature or corrosive ingredients which would be impossible with other forms of flexible fabric.

Due to the non-conducting characteristics of the belt or container when made of glass or silicious fibers or organic coated fibers, it may be used in conjunction with electrolytic operations where a metallic or conducting screen would be unsuitable.

For the cleaning of small objects or treating them with acid or alkaline solutions, the system of Figure 9 may likewise be employed.

Where the container and its contents require cleaning or renovation, after a period of use, the container, whether in the pad or bag form or a continuous belt, may be passed through a cleaning solution or treated in a manner similar to the initial formation of the "Lamisilite" or the like.

Instead of holding the active material loosely in the foraminate or reticulate container above described, it may be caused to adhere to the surface or surfaces of a sheet or panel of the flexible fibrous material. For example, a sheet or panel with the active material cemented or bonded to the surface or surfaces of the same may be employed for adsorption or adsorptive work. A series of such sheets with attached active material may be supported in parallel spaced relation in a frame or encircling tubular member through which the gaseous fluid to be treated is caused to flow. The outer margins may be free of the material for mounting the sheet or panel. Protective sheets or panels may be disposed over the surfaces having the active material adhering thereto.

From the foregoing it may be seen that my invention has a wide application in the industrial and chemical arts, and provides a new utility or tool for use where, owing to the corrosive character of the contents or the temperature of the same, ordinary flexible fabrics are unsuitable or incapable of use. The container of my invention is resistant to deterioration by corrosive or temperature influences to substantially the same extent that glassware, such as carboys, glass-lined tanks and the like, but furnishes the very desirable characteristic of flexibility in the container, thus avoiding breakage and permitting handling of loose materials in a manner entirely new in the art.

The flexible character of the open mesh container is of particular value in certain situations. For adapting the container to fit closely in certain spaces the flexible pad-like character is valuable. Also, because of the flexible character of the container, a certain amount of agitation of the contents is possible. Likewise, under a tendency for the contents to mat or set, the flexible container may be agitated to break up or disengage such matting or setting of the particles.

I claim:

1. Method of preparing an adsorbent body of fragile material in flake form suitable for adsorption of fluid in the vapor phase, which comprises enclosing a body of silicious ore in an open mesh flexible container, and leaching the container and ore in acid, while avoiding objectionable agitation of the ore and breakage of the contained silica flakes, thereby transforming the ore in situ into flake silicon dioxide.

2. Method of preparing a self-contained body of loose particles having adsorptive properties, which comprises enclosing a body of loose grains of silicious ore in an open mesh flexible container which is resistant to heat and chemical reagents, leaching the ore, while held in said container and in the absence of objectionable agitation, in a suitable reagent to remove impurities and to leave in the container particles of silicon dioxide having the desired adsorptive properties.

3. Method of preparing a mass of lamisilite for adsorptive purposes, which comprises charging a flexible open mesh fabric container with ore of the class of vermiculite, biotite and jeffersite, leaching the ore in the container with sulphuric acid to release flakes of lamisilite from the impurities in the ore, while avoiding subjecting the ore to agitation and pressure of a character to cause objectionable breakage of the lamisilite flakes, and separating the flakes of lamisilite from the impurities by washing the impurities out through the mesh of the fabric container while retaining within the container the separated lamisilite flakes.

4. A flexible fabric of loose mesh with adherent flakes of lamisilite, said lamisilite being in substantially unbroken flake form and adapted to be subjected to heat and chemical reagents during use and cleaning operations, said fabric being substantially inert to the temperatures and chemical reagents encountered.

5. Method of developing the adsorptive properties of silicon dioxide, which comprises enclosing a body of a suitable ore such as vermiculite or biotite in granular or loose form within a reticulated container of inert fiber fabric, leaching the ore in said container in sulphuric acid to free the silicon dioxide of impurities and thereby form an adsorption element, while avoiding subjecting the ore to appreciable agitation or pressure, then drying the said element.

6. Method of preparing an active adsorbent element, which comprises enclosing a silicious ore in a glass fiber bag and leaching the bag and ore in acid, in the absence of appreciable agitation or pressure to transform the ore in situ into silicon dioxide.

7. Method of cleaning loose adsorbent material after use, which comprises enclosing the same in a glass fiber envelope and leaching envelope and contents with a cleaning reagent in the absence of appreciable agitation or pressure.

8. The method of preparing a body of silica in flake form, which comprises enclosing a body of material containing flake silica and acid soluble impurities in an open mesh container resistant to acid, and immersing said container and material in acid without agitation of said material and resultant breakage of the silica flakes, whereby the impurities are removed leaving the silica within the container in substantially pure and unbroken flake form.

9. The method of preparing a body of silica in flake form, which comprises enclosing a body of material containing flake silica and soluble impurities in a container resistant to a solvent of said impurities and of a character to permit ready passage therethrough of the solvent and the dissolved impurities while retaining the flake silica, and flowing through said container and material a solvent of said impurities, without subjecting said material to agitation or appreciable pressure of a character to cause objectionable breakage of the silica flakes, whereby the impurities are removed from the material leaving the silica within said container in substantially pure and unbroken flake form.

10. A unitary package of adsorbent material comprising a closed container of open mesh fiber fabric inert to sulphuric acid and a charge of adsorbent material.

11. A unitary packing of adsorbent material comprising a closed container of open mesh spun glass fiber fabric and a charge of adsorbent material consisting of silica flakes having adsorbent properties.

12. Method of producing a finished package of adsorbent material capable of use in the original package and in substantially its original unbroken form which comprises enclosing a charge of loose broken up silica flake bearing ore within a flexible open mesh baglike container of spun glass fiber constituting the container of said finished package, and removing the impurities from said ore through the walls of the container and releasing the silica flakes in adsorbent form by leaching with acid thereby leaving within the container the finished adsorbent silica flakes.

13. Method of producing a finished adsorbent pad which comprises enclosing in a porous open mesh flexible container of spun glass fibers constituting the container of said finished pad, a mass of loose particles of silica bearing ore of the type which contains thin flakes of silica separated by layers of impurities, and extracting the impurities through the walls of the bag by leaching with acid, thereby releasing in the original container adsorbent flakes of silica and constituting the original package a finished usable package of adsorbent material.

14. For use in a gaseous fluid contact apparatus, a flexible pliant adsorbent body consisting of a flexible fabric container pervious to gaseous fluids, and a mass of adsorbent material retained in said container, said adsorbent material comprising a flaky amorphous form of silicon dioxide and movable as a mass with said container for treatment, the container and the material therein being capable of resisting the action of a strongly oxidizing reagent.

15. A unitary body suitable for adsorption of constituents of a gaseous medium comprising an outer skin of silicious fabric of open mesh and a filling of allotropic amorphous silica.

16. A unitary adsorption element comprising a container of open mesh spun glass fabric and filling of "Lamisilite."

17. As an article of manufacture, a self-contained adsorbent unit comprising an outer textile skin or covering of open mesh flexible acid resisting inorganic fiber pervious to gases to be treated and an adsorbent filler contained therein, said adsorbent filler consisting of separate particles, said unit being capable of being cleaned by dipping in a strongly oxidizing reagent and capable of withstanding temperatures in excess of boiling water.

ROBERT G. GUTHRIE.